Aug. 19, 1952     W. J. ALBERSHEIM     2,607,916

LIGHT CONTROLLED CHANNEL DEVIATION INDICATOR

Filed Dec. 22, 1947     2 SHEETS—SHEET 1

INVENTOR
W. J. ALBERSHEIM
BY Stanley B. Kent
ATTORNEY

Aug. 19, 1952     W. J. ALBERSHEIM     2,607,916
LIGHT CONTROLLED CHANNEL DEVIATION INDICATOR
Filed Dec. 22, 1947                                2 SHEETS—SHEET 2
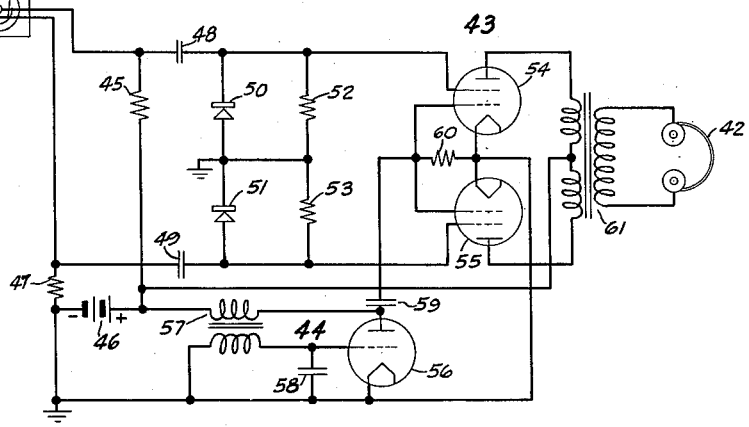
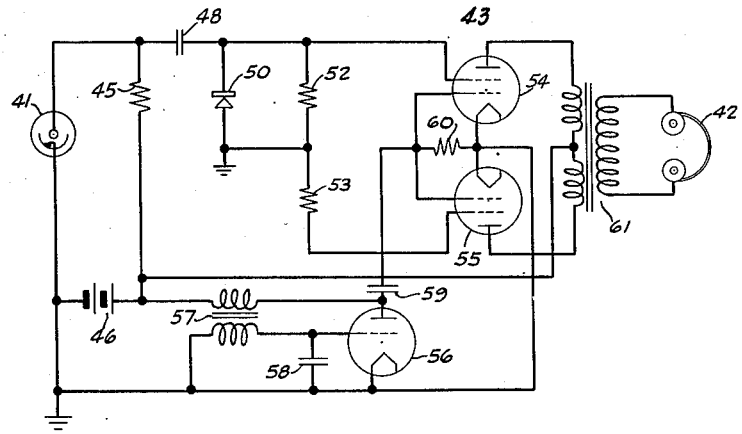
FIG. 7
(1) A —
(2) N —
(3) A+N
(4) A (PREDOMINANT) + N
(5) A.C. COMPONENT ONLY OF (4)
(6) RECTIFIED CURRENT OF (5)
(7) AUDIO FREQ. IN TELEPHONE REC.
INVENTOR
W.J. ALBERSHEIM
BY Stanley B. Kent
ATTORNEY Patented Aug. 19, 1952

2,607,916

UNITED STATES PATENT OFFICE 2,607,916

LIGHT CONTROLLED CHANNEL DEVIATION INDICATOR

Walter J. Albersheim, Interlaken, N. J., assignor to Bell Telephone Laboratories, Incorporated, New York, N. Y., a corporation of New York Application December 22, 1947, Serial No. 793,192

7 Claims. (Cl. 343—110)

This invention relates to a light-controlled channel deviation indicator.

An object of the invention is to provide an improved system for indicating deviations from a desired course of travel.

There is often need in the field of navigation, particularly on water, of an inexpensive optical device to indicate a vessel's lateral deviation from the center line as it proceeds along a narrow channel. A plurality of marker lights located on the prolongation of the center line of the channel have been used. Because of the nature of the terrain, such marker lights are often impractical and the need for a single optical device becomes evident.

The present invention provides a signaling system including such a device.

In an illustrative embodiment of the invention a sharply focussed beam of light is directed along the center line of the channel, the axis of the beam being directed alternately from side to side a few degrees. The rhythm of the deviation is such that the light flashes to one side correspond to the letter "A," dot-dash, of the Morse code, while the light flashes to the other side correspond to the letter "N," dash-dot. Due to the overlapping of the beam along the center line of the channel the combined beams appear as a single beam of uniform intensity to an observer located on the center line. Since it is impractical, if not impossible, to produce beams of uniform intensity across their whole width, small deviations from the center line are difficult to detect by optical observations. In order to observe small deviations an electro-optical audio receiving device is utilized. A portion of the received light at the position of the observer is directed to a photoelectric cell and transduced into electrical current of similar wave form. The alternating current components are selected, rectified and used to key an amplifier of audio frequency oscillations which may be observed audibly in a telephone receiver. If the "A" modulated light beam is predominant the audio signal will consist of the dot-dash sequence of the letter "A" of the Morse code. On the other hand, if the "N" modulated light beam is predominant, the audible signal will consist of the dash-dot sequence of the letter "N." The aiming of the receiver is accomplished optically.

In the above described illustrative embodiment the beam may be deviated in the proper rhythm by a rotating mirror having conical sectors of slightly different inclination with respect to the axis of rotation. One 45-degree sector and one 135-degree sector of one and the same inclination are positioned respectively between a 45-degree sector and a 135-degree sector of one and the same but other inclination. A first objective lens directs light from a source of relatively small area to the sectored mirror to form an image of the light source close to the principal focal plane of a second lens. The image is formed slightly off the axis of the second lens and is shifted from side to side as the mirror rotates and brings the various sectors in succession into the path of the image-forming beam. At the receiver, audible signals are produced corresponding to the predominant beam at the position of the observer, as explained above.

Modified embodiments of the beam projector will be described hereinafter.

Other forms of electromagnetic radiation besides visible light may be utilized providing only that it is capable of being projected in reasonably well-defined beams in a predetermined rhythm. Such radiation comprises infra-red and ultra-violet light and certain radiation of wavelength longer than infra-red light.

While mention has been made particularly of navigation on water, use of this invention is not confined to that field. The invention may also be useful for aerial and other forms of navigation and travel.

The invention will now be described in more detail having reference to the accompanying drawings.

Fig. 5 shows one form of electro-optical audio receiver according to this invention.

Fig. 6 shows a simplified form of receiver.

Fig. 7 shows graphs illustrative of various optical and electrical conditions of the system of this invention.

The same reference characters are used in the several figures to identify identical elements.

Figure 1:
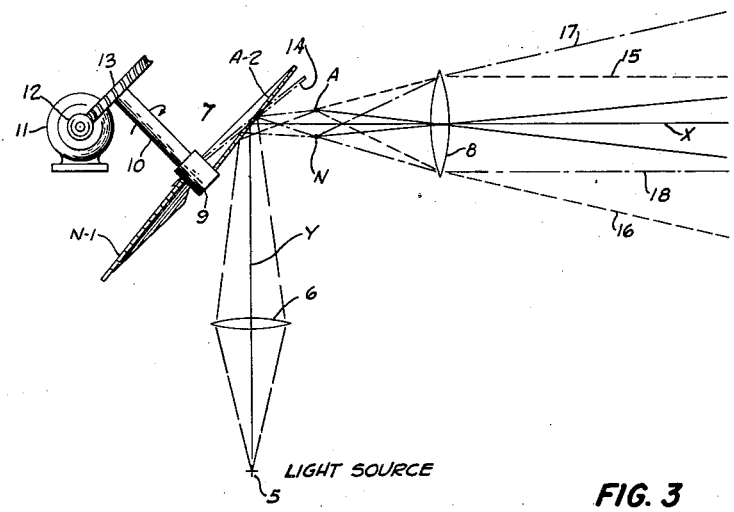
Fig. 1 illustrates schematically and partly in section one form of light projector comprising sectors of conical mirrors.
Figure 2:
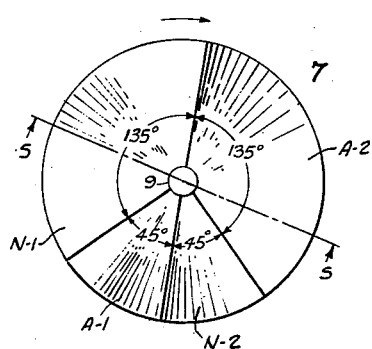
Fig. 2 is a face view of the mirrors of Fig. 1 looking along the axis of rotation.

Referring now to Figs. 1 and 2, an optical projector according to this invention is illustrated schematically comprising a source of light 5 of small area, an objective lens 6, a sectored rotating mirror 7 and a projection lens 8. The sectored mirror 7 comprises sectors A-1 and A-2 mounted on the enlarged portion 9 of shaft 10 at one and the same angle with respect to the axis of shaft 10 and sectors N-1 and N-2 mounted on said enlarged portion 9 of axis 10 at one and the same angle with respect to each other but at a different angle with respect to sectors A-1 and A-2. All of the sectors are shown in Fig. 2 which is a face view of the mounted mirror 7 looking along the axis of the shaft 10. Only sectors A-2 and N-1 are shown in Fig. 1 since the sectored mirror 7 is shown partially in section along the lines S—S of Fig. 2 looking in the direction of the arrows. The details of securing the sectors to the enlarged portion 9 of the shaft 10 are not shown for simplicity of illustration. The shaft 10 may be rotated at a suitable speed by motor 11 through the intermediary of spiral pinion 12 and gear 13.

The center line of the projected light is represented by the axis line X which is normal to the axis Y of the lens 6. The shaft 10 is positioned at angles of 45 degrees to both axes X and Y so that if sectors A-1, A-2, N-1 and N-2 were plane mirrors at right angles to the axis of shaft 10, the extension of axis Y after reflection would coincide with axis X. Since these sectors are sectors of conical surfaces with different slopes the reflection of axis Y is first to one side and then to the other of axis X depending upon which sector is in a position to be intersected by the axis Y. As shown in Fig. 1 sector A-2 is intersected by the axis Y and an image of the light source 5 is formed by lens 6 and sector A-2 at a position A which is slightly to one side of the axis X. When the sector N-1 reaches a position to be intersected by the axis Y as shown by the dot-dash line 14 in Fig. 1, an image of the light source 5 is formed at a position N which is slightly to the other side of the axis X from the side on which the image at position A is formed. The projection lens 8 is so positioned that the plane of the images at positions A and N is slightly closer to the lens 8 than its principal focal plane so that the projected beams are slightly divergent. The limiting rays from the image at position N are represented by the lines 17 and 18. These beams overlap along the axis X.

The nature of the lens system will be apparent from Fig. 1 even though the relative dimensions illustrated would not give the best results. By using lenses of shorter focal length and positioning them closer to the mirror sectors and by reducing the angular positions of the sector more light from the images at positions A and N could be directed to the lens 8.

As shown in Fig. 2, sectors A-1 and N-2 have an angular dimension of 45 degrees while the sectors A-2 and N-1 have angular dimensions of 135 degrees. The direction of rotation of the shaft 10 and the sectored mirror 7 is shown by the arrows in Figs. 1 and 2. As the shaft 10 rotates, say once or twice per second, pulses of light are projected after reflection by the mirror sectors A-1 and A-2 in the rhythm of the Morse letter "A," dot-dash, and by the mirror sectors N-1 and N-2 in the rhythm of the Morse letter "N," dash-dot. These codes are complementary so that the light projected along the center line X is a steady beam. To the sides of the center line X either the "A" code or the "N" code predominates.

Figure 3:
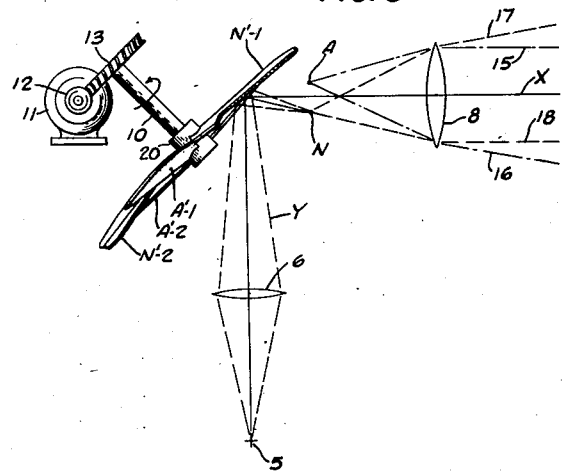
Fig. 3 illustrates schematically and partly in section a modified form of light projector comprising inclined plane mirrors mounted upon a rotatable shaft.

As mentioned above, the mirror sectors are conical in the embodiment of Fig. 1. In the modified embodiment shown in Fig. 3 the mirror sectors are plane mirrors mounted on an enlarged portion 20 of the shaft 10. The sectors A'-1, A'-2, N'-1 and N'-2 correspond to the sectors A-1, A-2, N1 and N2, respectively, of Fig. 1 in their function of forming images of the light source 5 at positions A and N. The angular dimensions of these sectors in Fig. 3 are the same as the corresponding sectors in Fig. 1. In order that reflection of the light by sectors A'-1 and A'-2 may produce light pulses according to the "A" code, dot-dash, and reflection of the light by sectors N'-1 and N'-2 may produce light pulses according to the "N" code, dash-dot, the shaft 10 must be rotated in the direction shown by the arrow in Fig. 3, that is, in the opposite direction to that shown in Fig. 1. The use of plane mirror sectors results in greater distortion in the direction of projection of the projected beam over that produced by the conical sectors, but such distortion may sometimes be tolerated in view of the simplified structure resulting from the use of plane mirrors.

Figure 4:
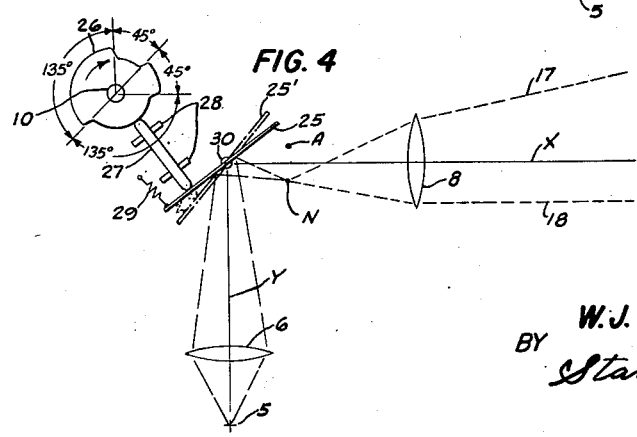
Fig. 4 shows schematically another form of light projector comprising an oscillatable plane mirror.

Another modified embodiment of the invention is illustrated in Fig. 4. In this embodiment the rotating sectored mirrors of Figs. 1 and 3 have been replaced by an oscillatable plane mirror 25. Mirror 25 is mounted to oscillate about an axis in the plane of the reflecting face and perpendicular to the plane of the drawing. Mirror 25 is oscillated by cam 26 mounted on a shaft 10 and a cam follower 27 slidable in guides 28, 28. A spring 29 holds the back of mirror 25 against the cam follower 27, the mirror 25 being pivoted for oscillation in supports 30, 30, one only of which is shown. With the mirror 25 in the position shown in full lines, an image of the light source 5 is formed at the point N to one side of the center line X. With the mirror 25 in the position shown by the dot-dash lines 25' the image of source 5 is formed at the point A. From the positions A and N the projection of the light pulses by lens 8 is the same as has been described hereinbefore. A minimum of distortion of the projected beam is caused by the arrangement of Fig. 4 at the expense of the attendant difficulties of a reciprocating mirror movement.

It will be obvious to persons skilled in this art that other projecting systems may be used and that other complementary codes may be employed. The essential requirement is that on the center line of the system the overlapping beams will produce a steady beam of light.

At the receiver, both a visual and an audible indicator of the projected beam is provided. As shown in Fig. 5 the incoming light represented by the dot-dash line 35 may be observed by an observer at 36 in a special telescope 37 comprising an objective lens 38 and an eye-piece 39. If the observer is positioned on the extension of the center line X of the projector, the light seen by the observer will be a steady light. If the observer is far to the side of the center line X, he will see the code flashes of the "A" or "N" signals dependent upon which side he happens to be. However, if the observer is only a small distance to one side of the center line X, he will be unable to determine which of the "A" and "N" signals is predominant. In order to overcome this difficulty an audible indicator is also provided.

Referring again to Fig. 5 a semitransparent mirror 40 is arranged to reflect a portion of the received light to a photoelectric cell 41 located within the telescope 37 which controls the production of an audible code tone in telephone receiver 42 by controlling the keying of a push-pull amplifier 43 energized by audio oscillations from oscillator 44. The anode of photoelectric cell 41 is connected through resistor 45 to the positive terminal of a source of direct current voltage such as battery 46 and the cathode is connected through resistor 47 to the negative terminal of battery 46. Furthermore, the anode of photoelectric cell 41 is connected through condenser 48 and the cathode through condenser 49 to the push-pull input circuit of amplifier 43 comprising rectifiers 50 and 51 and resistors 52 and 53. The junction points of rectifiers 50 and 51 and resistors 52 and 53 are connected together through ground to the cathodes of tetrodes 54 and 55 of amplifier 43. The oscillator 44 comprises a triode 56, a coupling transformer 57 and a frequency-determining condenser 58. The output circuit of the oscillator 44 is connected through condenser 59 across resistor 60, one terminal of which is connected to the control grids of tubes 54 and 55 and the other terminal to the cathodes of these tubes. The anode current of tubes 54 and 55 flows in opposite directions to the primary windings of balanced output transformer 61, the secondary winding of which is connected to the headphone 42.

If the oscillator 44 is set to produce a frequency of 1,000 cycles per second and the input circuit of amplifier 43 is substantially balanced, as when the illumination of photo-electric cell 41 is steady or zero, no tone or substantially no tone, will be heard in the telephones 42. Steady or zero illumination of photoelectric cell 41 results in a steady voltage from the anode to the cathode of the cell 41. Such a steady voltage is devoid of an alternating-current component which alone can unbalance the input circuit of amplifier 43 acting through condensers 48 and 49. If the illumination of the photoelectric cell 41 increases, for instance, in the "A" rhythm, the voltages across resistor 45 and battery 46 and across resistor 47 will fluctuate in the same rhythm but in opposite phase with respect to ground. Their alternating current components only will be impressed upon the other control grids of tubes 54 and 55 through coupling condensers 48 and 49 after rectification by rectifiers 50 and 51. The purpose of these rectifiers is to associate an increase in 1,000 cycle output tone only with an increase in light above the average value for any position of the observer. Without them both plus and minus light variation from said average value would produce equal unbalance of the push-pull modulation hence equal sound intensity. With the rectifiers as shown the input circuit of amplifier 43 will be unbalanced in the same rhythm and an amplified audible tone of the "A" code only will be received in the headphones 42. If the illumination increases in the "N" rhythm an audible tone of the "N" code only will be received.

A simplified receiver is shown in Fig. 6 wherein the input circuit of one tube 54 only of the amplifier 43 is affected by changing illumination of photoelectric cell 41. In other words, the resistor 47, condenser 49 and rectifier 51 are omitted from the circuit of Fig. 5. The operation of this circuit will be apparent from the description of the operation of the receiver of Fig. 5 given above.

The semitransparent mirror 40 may comprise a thin layer of gold on a glass plate, the gold layer being produced by sputtering. Such a layer can be made nearly transparent to visible light and at the same time strongly reflecting to infra-red light. If the projected beam comprises infra-red light as well as visible light and a photoelectric cell is used which is particularly sensitive to infra-red light, such as a caesium type cell, a particularly sensitive and useful device is produced.

In place of or in addition to the headphone 42 a visual indicator may be used, such as a flashing lamp.

Fig. 7 illustrates graphically how the receiving system of Fig. 5 functions. If only the "A" code is incoming, the illumination of the photoelectric cell 41 is shown by graph (1). If only the "N" code is incoming, the illumination is shown by graph (2). If the receiver is positioned on the center line X of the projected beam, both the "A" and "N" codes will be received in substantially equal amounts and a steady illumination of the photoelectric cell 41 will result as shown in graph (3). If the "A" code is predominant, the illumination of the cell will vary as shown by graph (4). The alternating current components only of the resulting electric current in resistors 45 and 47 are shown by graph (5). When this current is rectified by rectifiers 50 and 51 the resulting direct current voltage in resistors 52 and 53 is shown in graph (6). This direct current voltage varies according to the "A" code and unbalances the push-pull amplifier 43 so that there may be heard in the headphones 42 an audio frequency according to the "A" code only as shown in graph (7).

Modifications of the above described specific embodiments of the invention will occur to persons skilled in this art. Such embodiments come within the purview of the appended claims.

What is claimed is:

1. A signalling system comprising means to transmit a diverging beam of light in a predetermined direction, other means to transmit another beam of light in a different predetermined direction partially overlapping said first beam, means alternatively energizing said two beams according to a predetermined code, whereby when one of said beams is energized the other is deenergized, light sensitive electric means adapted to be illuminated by light rays within only a relatively small solid angle of one or both of said beams, an indicating means, and an alternating current responsive, direct current rejecting, electric network connecting said light sensitive means to said indicating means.

2. A pulse light beam transmitter and receiver comprising a sectored mirror rotatable about an axis, said mirror sectors being differently inclined to said axis of rotation to form two complementary codes, a stationary lens positioned with its axis intersecting said mirror sectors in succession as the mirror is rotated, a source of light positioned with respect to said lens to have slightly overlapping images formed after reflection by said mirror sectors, a second lens positioned to project overlapping, complementary coded, light beams from said images in succession as the mirror is rotated, light sensitive electric means adapted to be illuminated by light rays within only a relatively small solid angle of one or more of said beams, and indicating means controlled by said light sensitive electric means to reproduce the code signal only of the one of said beams which is predominant regardless of the absolute values of the light intensities of said beams.

3. A pulse light beam transmitter comprising a mirror pivotal about an axis, a stationary lens, a source of light positioned with respect to said lens to have images formed after reflection by said mirror, a second lens positioned to project light beams from said images, means changing the angle of incidence of said light source on the mirror upon movement of the mirror, and means periodically moving said mirror in accordance with a predetermined code to reflect light from said source through said second lens into two partially overlapping beams in accordance with a predetermined code.

4. A pulse light beam transmitter comprising a sectored mirror rotatable about an axis, said mirror sectors being differently inclined to said axis of rotation, a stationary lens positioned with its axis intersecting said mirror sectors in succession as the mirror is rotated, a source of light positioned with respect to said lens to have images formed after reflection by said mirror sectors, and a second lens positioned to project light beams from said images in succession as the mirror is rotated.

5. A pulse light beam transmitter comprising a sectored mirror rotatable about an axis, each mirror sector conforming to a sector of a cone with its apex in the said axis of rotation and being differently inclined from another sector to said axis of rotation, a stationary lens positioned with its axis intersecting said mirror sectors in succession as the mirror is rotated, a source of light positioned with respect to said lens to have images formed after reflection by said mirror sectors, and a second lens positioned to project light beams from said images in succession as the mirror is rotated.

6. A pulse light beam transmitter comprising a sectored mirror rotatable about an axis, said mirror sectors having plane reflecting surfaces and being differently inclined to said axis of rotation, a stationary lens positioned with its axis intersecting said mirror sectors in succession as the mirror is rotated, a source of light positioned with respect to said lens to have images formed after reflection by said mirror sectors, and a second lens positioned to receive light from said images and to project light beams in succession as the mirror is rotated.

7. A pulse light beam transmitter comprising a sectored mirror rotatable about an axis, certain of said mirror sectors being differently inclined to said axis of rotation than certain others of said mirror sectors and having angular dimensions to produce as the sectored mirror is rotated desired code pulses by light reflected from sectors having the same inclinations, a stationary lens positioned with its axis intersecting said mirrors in succession as the mirror is rotated, a source of light positioned with respect to said lens to have images formed after reflection by said mirror sectors, and a second lens positioned to receive light rays from said images and to project light beams corresponding to said rays in succession as the mirror is rotated.

WALTER J. ALBERSHEIM.

REFERENCES CITED

The following references are of record in the file of this patent:

UNITED STATES PATENTS

| Number | Name | Date |
|---|---|---|
| 710,243 | Brebner | Sept. 30, 1902 |
| 718,217 | Purves | Jan. 13, 1903 |
| 1,548,958 | Sperry | Aug. 11, 1925 |
| 1,619,198 | Edison | Mar. 1, 1927 |
| 1,629,506 | Jensen | May 24, 1927 |
| 1,791,030 | Jones | Feb. 3, 1931 |
| 1,878,331 | Savage | Sept. 20, 1932 |
| 1,991,474 | Taylor | Feb. 19, 1935 |
| 2,026,361 | Runge | Dec. 31, 1935 |
| 2,030,872 | Hollmann | Feb. 18, 1936 |
| 2,165,304 | Runge | July 11, 1939 |
| 2,271,534 | Bailey | Feb. 3, 1942 |
| 2,288,196 | Kramar | June 30, 1942 |
| 2,416,096 | Hadfield | Feb. 18, 1947 |

FOREIGN PATENTS

| Number | Country | Date |
|---|---|---|
| 579,167 | Great Britain | July 25, 1946 |